May 17, 1966     W. L. SPEICHER     3,251,514

LIQUID DISPENSING JUG HAVING A VENTED HANDLE

Filed March 13, 1964

INVENTOR.
Wallace L. Speicher

BY

Hovey, Schmidt, Johnson & Hovey,
ATTORNEYS.

United States Patent Office 3,251,514
Patented May 17, 1966

3,251,514
LIQUID DISPENSING JUG HAVING A VENTED HANDLE
Wallace L. Speicher, Kansas City, Mo., assignor to Container Supply Company, Kansas City, Mo., a corporation of Missouri
Filed Mar. 13, 1964, Ser. No. 351,677
7 Claims. (Cl. 222—468)

This invention, which is a continuation-in-part of my application Serial No. 222,471, filed September 10, 1962, entitled "Dispensing Container," and subsequently abandoned, relates to a jug of the type used to dispense liquids and, more particularly, to such a jug which has as a part thereof, a receptacle for receiving the liquid to be dispensed, there being an outlet spout in communication with said receptacle, and a tubular handle in communication with the outlet spout and the receptacle.

It is the most important object of this invention to provide a jug for disensing liquids, which jug includes a receptacle for receiving the liquids to be dispensed, there being an outlet spout in communication with the receptacle, the outlet spout having an outlet end and an inlet end, there being a tubular handle for the jug, which handle has one end thereof in communication with the outlet spout intermediate the ends of the latter, and the other end thereof in communication with the receptacle whereby the handle may serve to deliver air to the receptacle as the jug is tipped to dispense liquid therefrom.

A yet further important object of this invention is to provide a jug for dispensing liquids wherein the outlet spout is of such a configuration that, as the liquid moves outwardly from the receptacle of the jug the same is forced to flow against the wall of the outlet spout opposite to that receiving the tubular handle whereby air may be continuously admitted through the tubular handle and into the receptacle of the jug as liquid is dispensed from the jug through the outlet spout thereof, all to the end that there is no gurgling of the liquid as the same is dispensed from the jug.

In this respect it is well known that when liquid is dispensed from a jug or similar container having an outlet of limited area with respect to the over-all area of the container, there is a gurgling effect caused by air entering the opening in the container alternately with liquid leaving the opening, whereby the flow of liquid from the container is continuously interrupted and the emptying of the container takes a considerable length of time.

It is, therefore, a major object of this invention to provide, in a jug for dispensing liquids, a combination of elements which cooperate to eliminate any gurgling as liquid is poured from the jug and to achieve a smooth and continuous outward flow of liquid.

To this end, it is an important object of this invention to provide a jug for dispensing liquids which includes a receptacle adapted to be initially filled with a liquid to a predetermined level whereby to leave a pocket of air in the uppermost portion of the receptacle, the jug being of such a configuration and the pocket of air being so positioned that, when the jug is initially tipped to pour liquid therefrom, the air pocket moves from its first position above the liquid level in the jug to a second position substantially above the liquid level and in communication with the end of the handle which is in communication with the receptacle of the jug, thereby allowing air from the atmosphere to expand said air pocket as the jug is tipped.

It is a yet further object of the invention to provide, in the outlet spout of the receptacle, such a configuration that liquid passing outwardly therefrom is forced away from the wall of the spout receiving the tubular handle whereby the liquid will not block the entrance to the tubular handle thus permitting the handle to be in communication with the atmosphere continuously during the emptying of the jug, all to the end that air may be supplied to the interior of the receptacle through the handle and without causing disruption of the flow of liquid from the jug.

Other objects of this invention include the provision of a configuration for the outlet spout of the jug to define an inwardly extending, semicircular, rounded shoulder on that portion of the wall of the spout receiving the handle, said inwardly extending shoulder being below the point of juncture of the handle with the spout wall and lying in a plane closer to the wall of the spout opposite to that receiving the handle than the plane of the wall of the spout receiving the handle which is above the point of juncture with the handle, the inwardly extending shoulder cooperating with the wall opposite thereto to define an area of smaller cross section than the cross-sectional area of the inlet and outlet ends of the spout, the wall of the spout opposite to that receiving the handle being substantially vertical throughout the length of the spout, and the wall of the spout adjacent its point of juncture with the lowermost portion of the handle tapering outwardly as the inlet end of the spout is approached, all to the end that the results hereinabove set forth may be fully accomplished.

Figure 1:
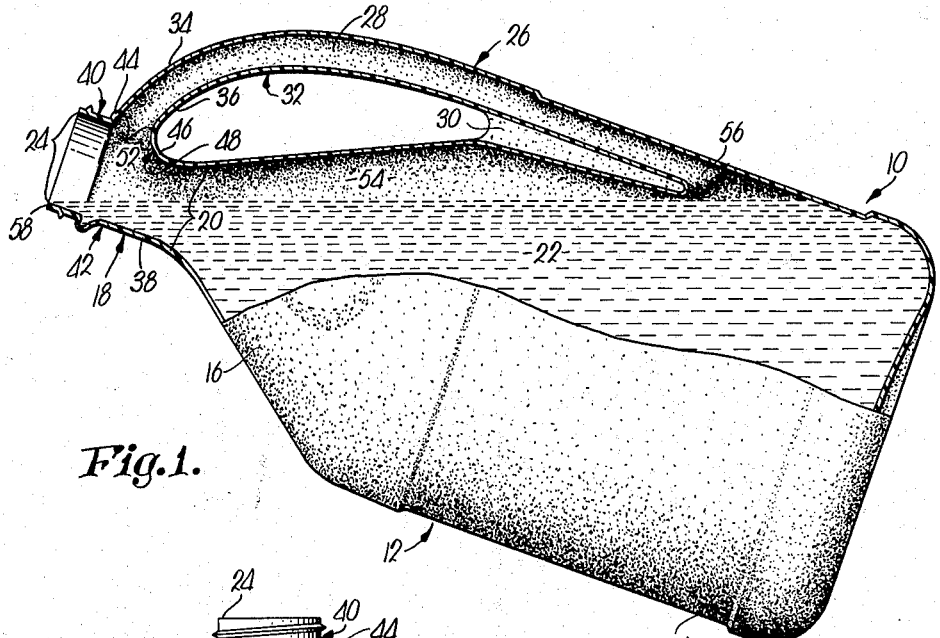
FIGURE 1 is an elevational view partially in section showing the jug as it is initially tipped with the liquid therein just reaching the outlet end of the outlet spout.
Figure 2:
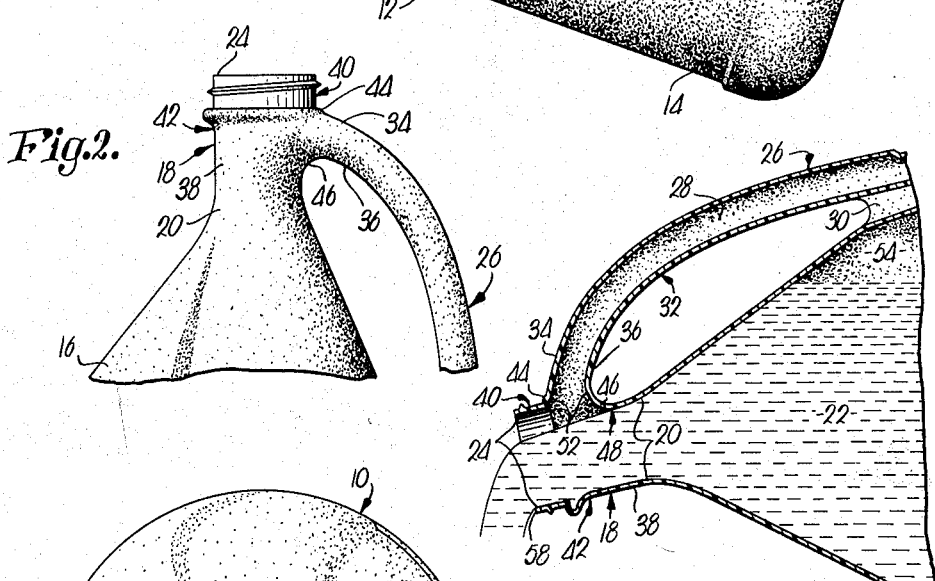
FIG. 2 is a fragmentary, side elevational view of the upper end of the jug showing the outlet spout and a portion of the receptacle and the handle.

The jug is broadly designated by the numeral 10 and includes a receptacle 12, said receptacle having a lower portion 14 and an upper, tapered portion 16, the tapered portion 16 merging into an outlet spout 18.

The jug 10 is preferably formed as a single unit from a plastic or similar material as by well known methods of molding such materials, the receptacle portion 12 of the jug 10 assuming any desired size and configuration so long as the upper portion 16 of said receptable 12 tapers inwardly as illustrated in the drawing whereby the same may be placed in communication with the inlet end 20 of the outlet spout 18 to thereby allow liquid such as 22 to pass out of spout 18 through its outlet end 24.

A tubular handle 26 is formed as a part of the jug 10 and is in communication with the outlet spout 18 and the receptacle 12, the tubular handle 26 defining a centrally disposed passage 28 which extends throughout the length of the handle 26 and places the outlet opening 24 of the jug 10 in communication with the lower portion 14 of the receptacle 12. A web 30 is disposed between a portion of the handle 26 and the exterior wall of the receptacle 12, as shown best in FIG. 1 of the drawings, this web adding rigidity to the over-all construction and serving to retain handle 26 against undesirable lateral movement.

The handle 26 is defined by a wall 32 which is also plastic or the like, being made of the same material as the jug, the wall 32 having a normally uppermost portion 34 which merges with the outlet spout 18, and a normally lowermost portion 36 which likewise merges with the outlet spout 18. The spout 18 is defined by a continuous side wall 38 which has one portion 40 thereof intersected by the handle 26, the other portion 42 of the side wall 38 being disposed opposite to that portion 40 which receives the handle 26.

As is apparent from the drawing, the handle 26 is in communcation with portion 40 of wall 38 which defines spout 18 at a point intermediate the ends of the outlet spout. As portion 34 of the wall of tubular handle 26 merges with portion 40 of wall 38, it defines a point of junction 44 between the uppermost portion of the handle 26 and the wall 38 of the outlet spout 18. From this point of junction 44 upwardly, the wall portion 40 of the spout 18 is substantially vertically disposed and lies in a first plane which is spaced from the plane of the remaining part of portion 40 of the wall 38. In this respect, the lowermost portion 36 of the wall 32 which defines handle 26, has a point of juncture 46 with the wall portion 40 whereby to define a rounded shoulder 48 which is in a second, generally vertical plane, the plane of shoulder 48 being spaced inwardly of spout 18 whereby to be positioned closer to the portion 42 of the spout wall 38 which is opposite to portion 40 than is that part of portion 40 which is above the handle 26.

Figure 4:
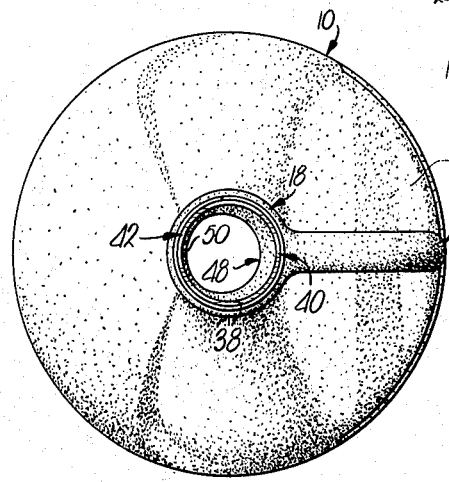
FIG. 4 is to top plan view of the jug.

The shoulder 48 is semicircular in plan configuration as seen in FIG. 4 of the drawing, substantially spans portion 40 of wall 38, and extends inwardly into the spout 18. The radius of the shoulder 48, as is apparent from FIG. 4 of the drawing, is not that of the arc of a circle by virtue of its inwardly extended condition. However, the portion 42 of spout wall 38 opposite to the shoulder 48 has the radius of an arc of a circle, this radius being best shown in FIG. 4 and being designated as 50 in the drawing. Portion 42 of spout wall 38 is substantially vertical throughout the length of the spout 18, as is that part of portion 40 of wall 38 above junction 44, whereas that part of portion 40 of the spout wall 38 below junction 46 tapers outwardly as the inlet end 20 of the spout 18 is approached.

Thus, it is seen that the inwardly extending shoulder 48 presents, intermediate the inlet end 20 and the outlet end 24 of spout 18, in cooperation with the opposed wall portion 42, a reduced cross-sectional area as opposed to the area of inlet end 20 and the outlet end 24. The presentation of the shoulder 48 in the outlet spout 18 causes liquid flowing from the receptacle 12 of jug 10 to move against wall portion 42 and away from the entrance 52 to passage 28 of handle 26, thereby allowing air to continuously flow into spout 18, entrance 52, and through passage 28 and into receptacle 12 as liquid is poured from the jug 10. This operation is clearly shown by FIG. 3 of the drawing which illustrates the manner in which the shoulder 48 causes the liquid 22 to move toward wall portion 42 and away from entrance 52 as the jug 10 is tipped to rapidly pour liquid therefrom.

To reach maximum achievement of the above described result, it is desirable that, when the jug 10 is initially filled with liquid, the same be placed in the receptacle portion 12 to a predetermined level whereby to present an air pocket 54 within the jug 10, which air pocket is above the liquid 22 and in upper portion 16 and spout 18 when the jug 10 is in a vertical position as it would normally be during shipment, storage or the like.

However, the predetermined liquid level and, therefore, the size of the air pocket 54, are such that, when the jug is first tipped to pour liquid therefrom, the air pocket 54, as it shifts to the position shown in FIG. 1 of the drawing, is placed in communication with the base end opening 56 of the passage 28 whereby to allow air entering the receptacle 12 of the jug 10 from the atmosphere through passage 28 of handle 26, to continuously reach the air pocket 54 as liquid is poured from the jug. In this manner, atmospheric air may freely reach air pocket 54, along a path unobstructed and unhindered by the liquid 22 as it is poured from the jug 10, to thereby replenish the supply of air in the jug and compensate for the liquid being poured therefrom, all without causing any undesirable gurgling or in any way impeding the smooth and continuous flow of liquid from the jug.

Figure 3:
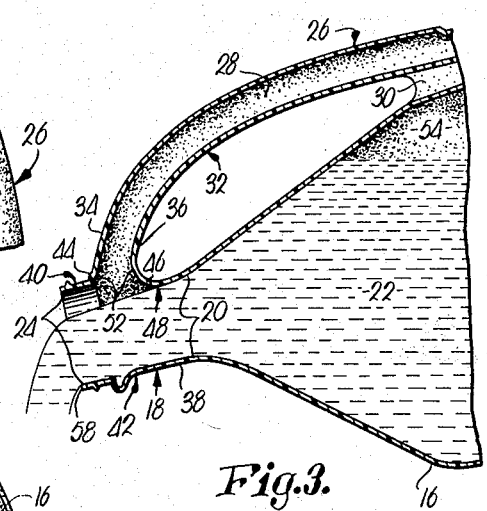
FIG. 3 is an enlarged, fragmentary, sectional view showing the upper end of the jug as the same is tipped beyond the point shown in FIG. 1 and liquid is being emptied therefrom.

This result is accomplished by virtue of the configuration of the outlet spout 18 of the jug 10 and the fact that the shoulder 48, as shown in FIG. 3 of the drawing, causes the liquid 22 to move away from the entrance 52 to the passage 28, thereby leaving a free air flow passage through the outlet spout 18 and into passage 28 of the handle 26 for air entering from the atmosphere whereby such air may reach the air pocket and supply the required air to the interior of the receptacle 12 as liquid is poured therefrom.

As indicated, to achieve a maximum result from the structure described, it is desirable that the jug be initially filled to a level so that when the jug is first tipped to the position as shown in FIG. 1 of the drawing, the air pocket 54 will reach a point of communication with opening 56 at the same time as the liquid 22 first reaches the rim 58 of the outlet spout 18, which rim defines outlet opening 24. As soon as liquid first moves out of the spout 18, the air pocket 54 is in communication with the atmosphere through handle 26 and outlet spout 18 whereby the liquid flow will not be interrupted by the ingress of air to the jug, thereby permitting smooth and continuous pouring of the liquid from the jug 10.

The jug 10 is molded as a single unit by a single step molding operation and it is not necessary to utilize a second operation or step to achieve a complete jug, as described herein. It has been found that the jug can be satisfactorily blow-molded from well-known plastics at an economical cost whereby the jug, with its advantageous and unique features, may be commercially competitive.

Having thus described the invention, what is claimed as new and desired to be secured by Letters Patent is:

1. A jug for dispensing liquids comprising:
   a receptacle adapted to be filled with said liquid;
   a spout formed as a part of said receptacle and having an outlet end and an inlet end and in communication with said receptacle; and
   a tubular handle for said jug, said handle being in communication with said spout and said receptacle, the handle communicating with the spout intermediate the ends of the latter, the wall of the spout between the normally uppermost portion of the handle, at its point of juncture with the spout, and the outlet end of the spout lying in a first plane, the wall of the spout between the normally lowermost portion of said handle, at its point of juncture with the spout, and the inlet end of the spout lying in a second plane, said second plane being closer to the wall of the spout opposite to that receiving the handle than said first plane.

2. A jug as set forth in claim 1, the wall of the spout opposite to that receiving the handle having the radius of an arc of a circle, the wall of the spout adjacent its point of juncture with the lowermost portion of the handle being of a different radius.

3. A jug as set forth in claim 2, said wall of the spout opposite to that receiving the handle being substantially vertical throughout the length of the spout, the wall of the spout adjacent its point of juncture with the lowermost portion of the handle tapering outwardly as the inlet end of the spout is approached.

4. A jug as set forth in claim 3, said wall of the spout adjacent its point of juncture with the lowermost portion of the handle defining an inwardly extending semi-circular, rounded shoulder which causes liquid passing outwardly through said spout to move against said wall of the spout opposite to that receiving the handle.

5. A jug for dispensing liquids comprising:
   a receptacle adapted to be initially filled with liquid to a predetermined level whereby to leave a pocket of air in said jug;
   a spout in communication with said receptacle and having an outlet opening; and
   a tubular handle for said jug, said handle having one end thereof in communication with said spout and the other end thereof in communication with said receptacle, the point of communication of said handle with said receptacle being positioned so that when said jug is first tipped to pour liquid therefrom the air pocket is placed in communication with said other end of the handle at the same time liquid first reaches said outlet opening, there being an inwardly extending shoulder formed in said spout beneath said one end of the handle, said shoulder forcing liquid flowing out of said spout away from said one end of the handle whereby to permit said handle to be in continuous communication with the atmosphere through the outlet opening of said spout during emptying of liquid from the jug.

6. A jug as set forth in claim 5, said other end of the handle being in continuous communication with said air pocket during emptying of liquid from the jug.

7. A jug as set forth in claim 6, there being a web connecting a portion of said handle with said receptacle.

References Cited by the Examiner

UNITED STATES PATENTS

| | | | |
|---|---|---|---|
| 64,436 | 5/1867 | McIntire | 222—468 X |
| 2,237,810 | 4/1941 | Casper | 222—478 X |
| 2,978,131 | 4/1961 | Garvey | 215—1 |
| 3,066,819 | 12/1962 | Cox | 215—1 |
| 3,069,039 | 12/1962 | Stickney. | |
| 3,092,275 | 6/1963 | Brunton et al. | 215—1 |

FOREIGN PATENTS 560,104  9/1957  Belgium.

M. HENSON WOOD, Jr., *Primary Examiner.*

RAPHAEL M. LUPO, *Examiner.*

A. KNOWLES, *Assistant Examiner.*